United States Patent [19]

Annin

[11] 4,019,702
[45] Apr. 26, 1977

[54] METHOD AND APPARATUS FOR GUIDING A JET AIRCRAFT IN A NOISE-ABATED POST-TAKEOFF CLIMB

[75] Inventor: Gordon D. Annin, Bellevue, Wash.

[73] Assignee: The Boeing Company, Seattle, Wash.

[22] Filed: Nov. 13, 1975

[21] Appl. No.: 631,525

[52] U.S. Cl. ............................. 244/182; 73/178 T; 235/150.22; 244/180
[51] Int. Cl.² ........................................ B64C 15/00
[58] Field of Search .......... 244/180, 182, 183, 186, 244/187, 188; 73/178 R, 178 T; 235/150.2, 150.22

[56] References Cited
UNITED STATES PATENTS

| | | | |
|---|---|---|---|
| 3,025,494 | 3/1962 | Andresen | 73/178 T |
| 3,522,729 | 8/1970 | Miller | 244/182 |
| 3,800,127 | 3/1974 | Knemeyer | 244/183 |

Primary Examiner—Trygve M. Blix
Assistant Examiner—Reinhard J. Eisenzopf
Attorney, Agent, or Firm—Christensen, O'Connor, Garrison & Havelka

[57] ABSTRACT

A pilot guidance system that computes and displays pitch and speed steering commands is automatically operated during the post-takeoff climb (at specified times clocked from the start of the takeoff run), to present commands that assist the pilot in cutting (and later in restoring) thrust for a predetermined interval to reduce engine noise, and in guiding the aircraft in a safe, gentle climb over the proximate community. The specified times (unique for each model of aircraft, airport, runway and departure flight path), synchronize the thrust cutback interval with the boundaries of the community in line with chosen departure path.

13 Claims, 4 Drawing Figures

METHOD AND APPARATUS FOR GUIDING A JET AIRCRAFT IN A NOISE-ABATED POST-TAKEOFF CLIMB

BACKGROUND

The present invention relates generally to pilot guidance instrumentation and more particularly, to a method and apparatus for automatically operating such instrumentation to assist the pilot in executing a thrust cutback maneuver for abating jet engine noise.

A number of methods have been proposed for reducing noise during the post-takeoff climb over residential and business communities in the vicinity of airports. Some of these have been partially successful.

Among the numerous prior proposals, the following were believed, at least initially, to have promise: reducing thrust to a precomputed level at a specified time from takeoff; accelerating to an above normal climbing speed and then automatically retracting flaps and concurrently reducing thrust; and reducing thrust at preestablished altitudes. Later studies have shown that each of these has one or more faults. Reducing thrust to a precomputed level results in inconsistencies in the flight paths of like-model aircraft, due to variation in performance. The implementation of automatic flap retraction is complex and costly, and time required to execute the maneuver is not always compatible with the community location. Pre-established altitudes, as benchmarks for the noise abatement maneuver, has resulted in thrust cutback times that are frequently not coincident with the boundaries of the community.

One proposal for overcoming this synchronization problem is to cut thrust (by the predetermined amount) at a specified time from the start of the takeoff run. Using times that are arrived at from variables including: aircraft type and model, airport runway and departure flight path, a reasonably accurate coincidence has been achieved between the position of the aircraft at thrust cutback and the community boundary. The acceleration and attained speed of aircraft, during the takeoff run and initial climb are sufficiently uniform from flight-to-flight so that the specified cutback time (which may be adjusted for wind direction and velocity) is a predictable distance of travel (ground distance) from the start of the runway. For a given departure path from a given runway, the cutback time is selected to yield a travel distance matching the distance to the closest boundary of the community. However even using this technique, the results have not been satisfactory because of the above-noted inconsistencies in the flight path when the thrust is reduced to some precomputed level.

There are other techniques, not enumerated above, that have been proposed, but again found undesirable for such reasons as: an increase in workload of the pilot; a decrease in controllability of the aircraft; and/or a lack of pilot confidence in the maneuver or in the instrumentation that governs the maneuver.

Accordingly, it is object of the present invention to provide method and apparatus for automatically generating and visually displaying steering commands that direct the pilot in executing a thrust cutback maneuver and assist him in piloting the aircraft over the community at the noise abated, lower thrust level.

A further object is to generate and display such commands at thust cutback and restoration times that are coincident with the flight of the aircraft over the community boundaries.

Also, it is an object to provide method and apparatus for directing a noise abatement maneuver that does not substantially increase the preflight and in-flight workloads of the pilot. Further objects are to: instill pilot confidence in the safety and effectiveness of the maneuver; insure full aircraft controllability and safe stall margins; insure the continuance of a positive, safe climb (no chance for loss of altitude); keep to a minimum, the cost of implementation; and use apparatus that is compatible with existing pilot guidance systems.

SUMMARY OF THE INVENTION

These and other objects are achieved in accordance with this invention by automatically operating a pilot guidance system (herein called the flight director) at timed intervals from the start of the takeoff run, to direct and assist the pilot (or control an auto-pilot) in cutting thrust (to an extent consistent with a safe stall margin) for a low-noise flight over the community. A clock, having means for setting the times for thrust cut-back and restoration, is automatically started as the aircraft commences the takeoff run, such as determined by brake release and/or throttle advance. The cutback and restoration times are set to coincide with the interval during which the plane overlies the community. Initially, the flight director is disposed in a first mode during which full thrust is applied for the takeoff and an initial steep climb. A pitch steering command is automatically computed and displayed for directing what the pilot is to do manually. As the post-takeoff climb carries the aircraft over the community, the first preset time on the clock causes a control signal to be issued to the flight director to switch it to a second mode. In such mode, the pitch steering command is lowered, and the pilot accordingly reduces pitch to satisfy the new command. A longitudinal speed command is also displayed, and the pilot in response thereto maintains the earlier achieved speed by cutting thrust to negate the acceleration otherwise accompanying the reduced pitch. This abates engine noise. As the aircraft passes over the trailing edge of the community, the clock reaches the preset thrust restoration time, and the control signal expires switching the flight director back to the first mode for continuing the climb at restored takeoff thrust.

In the currently preferred embodiment, a flight director of the type having a speed command feature, is utilized to compute and display the pitch and speed steering commands on an indicator. During the initial mode, the indicators are automatically operated to guide the pilot in flying a normal, relatively steep climb at full power. When switched to the second mode, the pitch and speed commands on the indicator, guide the aircraft into a limited climb rate, such as 500 to 1000 feet per minute, which is significantly less than the normal, steep post takeoff climb. The continuous, positive climb of the aircraft, although at a limited rate, gives assurance to the pilot that he is not going to lose altitude or otherwise adversely effect the controllability of the aircraft by reason of the cutback of thrust.

To alert the pilot of the approaching cutback time, means are provided in conjunction with the clock for giving a warning signal, such as a flashing light, a few seconds before the elapse of the present time. A like or similar warning signal may be provided in advance of the thrust restoration time.

These and further features, objects and advantages of the invention will become apparent to those skilled in the art from the following detailed description and appended drawings.

DESCRIPTION OF THE PREFERRED EMBODIMENT

Figure 1:
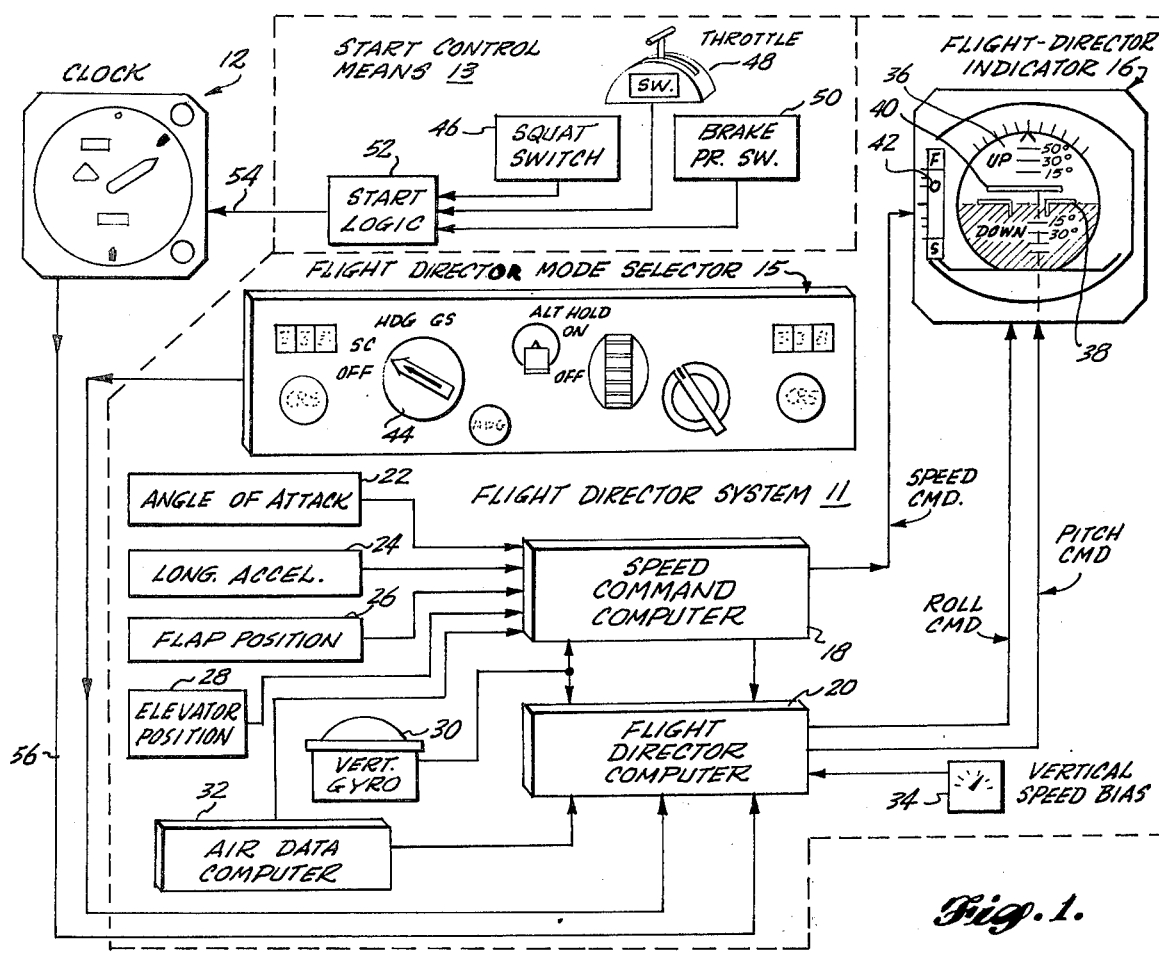
FIG. 1 is a block diagram of the apparatus in accordance with the present invention.

With reference to FIG. 1, the principal components of the illustrated embodiment include a flight director system 11, a clock 12 for controlling system 11 at preset times; and start control means 13 for starting clock 12 as the aircraft commences its takeoff run. System 11 is a modification of a standard flight director of the type having a speed command mode (unmodified systems of this type are used as standard equipment on many commercial aircraft). Included within system 11 are a pilot controlled mode selector 15, an indicator 16 for visually displaying actual and desired attitude and longitudinal air speed conditions, and speed command and flight director computers 18 and 20 respectively, for controlling indicator 16 in response to a plurality of input signals representing actual and desired flight conditions. Sensor derived angle of attack, longitudinal acceleration, flap position, elevator position, vertical gyroscope, air data computer (described herein) and vertical speed bias information is fed to either or both of computers 18 and 20 by input signal means 22, 24, 26, 28, 30, 32 and 34 respectively.

Indicator 16 visually displays the pitch and roll commands and longitudinal speed command by means of several meter movements. Actual pitch and roll attitudes are displayed by a background tape 36 (some devices use a sphere) that is movable with respect to a central, fixed, aircraft symbol 38. Up and down movement of tape 36 relative to symbol 38 displays actual pitch. Tape 36 rotates relative to symbol 38 to depict roll.

Superimposed on tape 36 and movable with respect to both tape 36 and symbol 38, is a pitch command bar 40, positionable by a separate, independent meter movement (not shown) to display a desired pitch (not necessarily the actual pitch) to which the plane is to be piloted. The meter movement controlling command bar 40 is responsive to a pitch command output signal from computer 20.

A separate meter movement (not shown) operates a speed command pointer 42 in response to an output signal from computer 18. Pointer 42 (usually called the Fast-Slow display) moves in response to the difference between actual longitudinal aircraft speed and a predetermined reference speed, where the centermost position (nulled) indicates that the aircraft has attained the reference speed.

Although system 11 has a number of operating modes, pertinent to the present invention is its speed command (SC) mode and this may be selected by a control knob 44 on selector 15 (this mode is also sometimes designated "go-around"). The SC mode is used during the post-takeoff climb and controls indicator 16 to guide the pilot in either a predetermined longitudinal speed climb (referenced to angle of attack) or in a climb limited to a fixed maximum pitch. In both cases, the aircraft is usually powered at full thrust to achieve a steep climb. By disposing control 44 in the speed command mode, computers 18 and 20 are conditioned to develop the proper pitch and longitudinal speed command signals for display on indicator 16. For the purpose of illustration, the predetermined longitudinal speed operation of the SC mode is disclosed in this embodiment.

Start control means 13 initiates the timing cycle of clock 12 in response to certain, predetermined conditions of a squat switch 46, throttle position switch 48 and brake pressure switch 50. When these switches are in a collective condition indicative of the commencement of a takeoff run, a start logic circuit 52 responsively triggers the operation of clock 12 over line 54. Switches 46, 48 and 50 are standard devices provided on most commercial aircraft. Squat switch 46 merely provides a discrete signal indicative of whether the aircraft is on the ground or airborne. Throttle switch 48 similarly provides a discrete signal as the throttle lever is moved forward to increase thrust. Switch 50 issues a discrete signal when the brakes are released. An output control signal from clock 12 is connected over line 56 to computer 20 for switching the operating mode of system 11 at predetermined elapsed times from the output signal of means 13.

Figure 2:
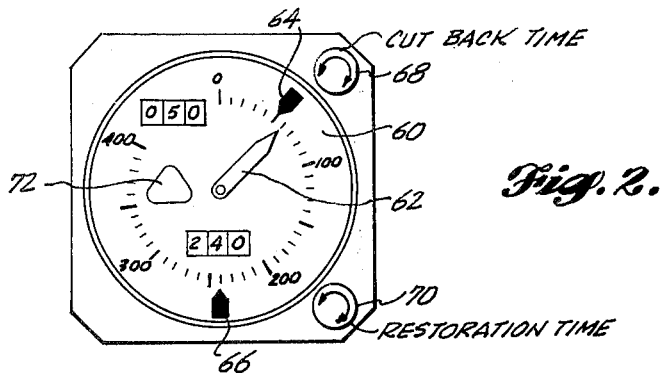
FIG. 2 is an enlarged plan view of the clock used in the apparatus of FIG. 1.

With reference to FIG. 2, clock 12 may be mounted on the flight deck instrument panel along with indicator 16, and mode selector 14, and may be driven by an electrical timer. The clock dial 60 may include a scale graduated in any suitable time increments, and by way of example, a scale of 0 to 400 seconds, at 10 second graduations, has been found satisfactory. The elapsed time is indicated by a clock hand 62 having a home position at 0 seconds, to which it is automatically reset after completing the maximum time cycle.

A pair of pointers 64 and 66 position adjustable by control knobs 68 and 70, are mechanically mounted on the clock, superimposed on dial 60, adjacent the scale. Pointer 64 sets the thrust cutback time and pointer 66 sets the restoration time. Electromechanical switches (not shown) coact with the timer of clock 12 and with the set positions of pointers 64 and 66 to issue a discrete signal over output line 56 when hand 62 lies between the set positions of the pointers. The mechanism for positioning the pointers may be constructed so that they can be set in a mutually superimposed relation (without permitting them to cross over each other and reverse their sequence). When so superimposed, no signal is issued to the flight director system. This serves to disable the noise abatement operation, when unwanted.

A mode indicator light 72 is disposed on the clock face. It may be provided with control circuitry for operating the light to flash on and off, as an alert, at a predetermined number of seconds (e.g., 2–5 seconds) before the thrust cutback time; to glow steadily during the noise abatement interval; to again commence flashing a predetermined number of seconds before thrust restoration time; and finally to turn off at the restoration time and remain off for the duration of the cycle.

Figure 3:
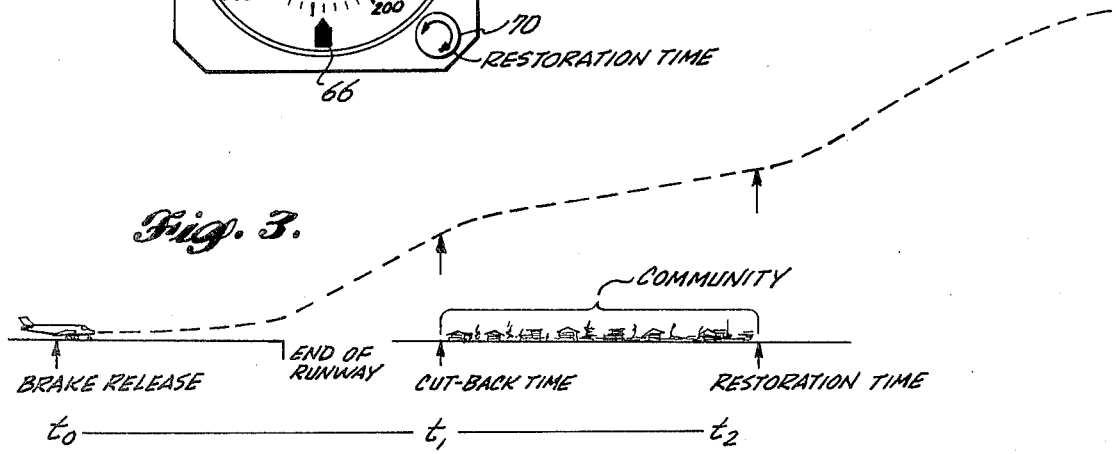
FIG. 3 is a graph of a post-takeoff profile resulting from the use of the invention.

In the flight profile of FIG. 3, the longitudinal speed command mode occurs between $t_0$ and the cutback time $t_1$. At time $t_1$, which is selected to approximately coincide with the time that the aircraft flies over the closest boundary of the community, the flight director system 11 (FIG. 1) is switched to a vertical speed command mode characterized by a relatively small, steady vertical velocity of the aircraft at a reduced thrust. This mode is represented here by the relatively straight, upwardly sloping profile between $t_1$ and $t_2$. The restoration time ($t_2$) is selected to coincide with the timing of the flight over the remote boundary of the community, and at this time clock 12 switches the flight director system 11 back to the normal, longitudinal speed command mode for completion of the takeoff climb at increased thrust.

Figure 4:
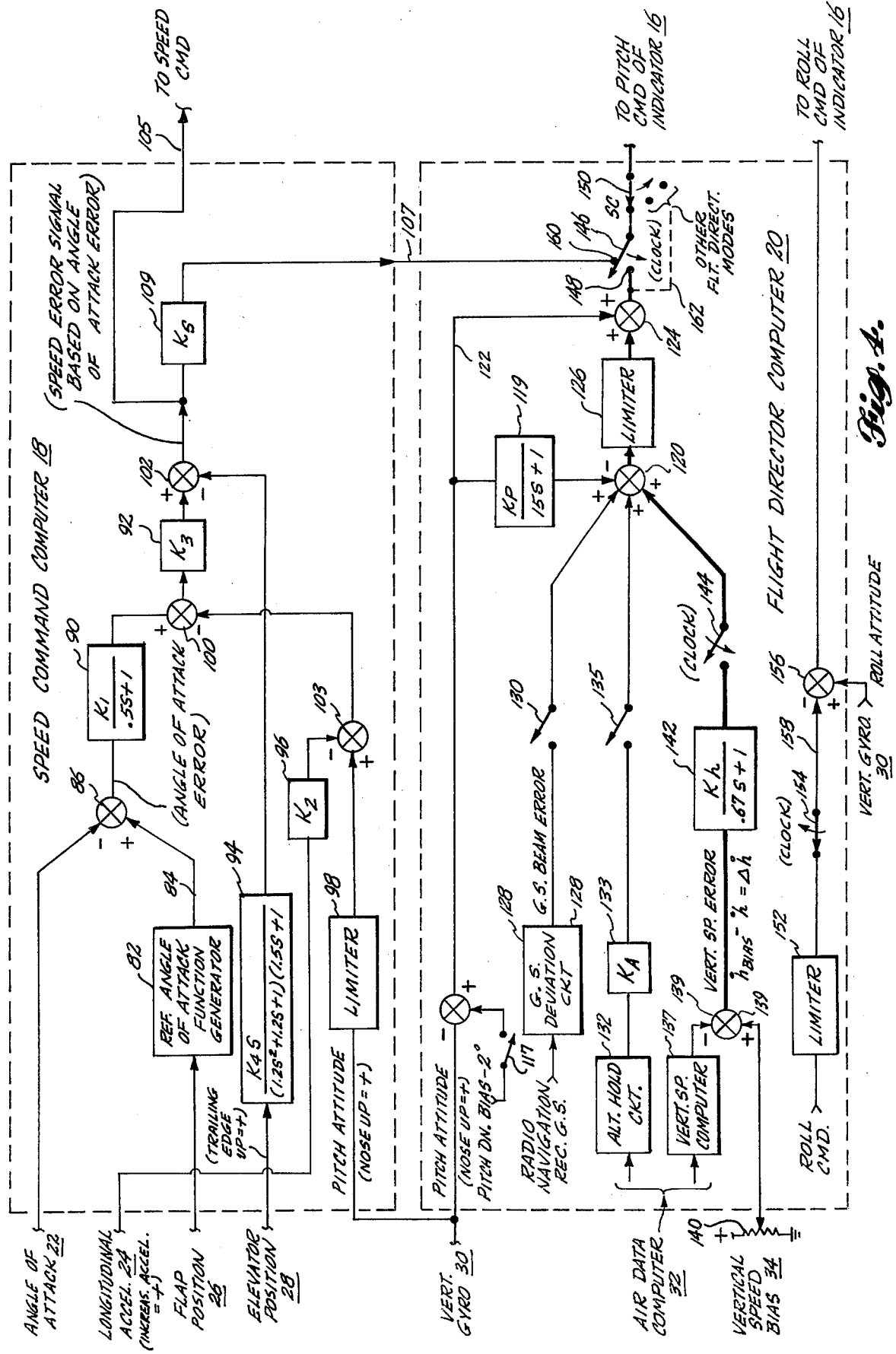
FIG. 4 is a detailed block and schematic diagram of computer circuitry used in the apparatus of FIG. 1.

With reference to FIG. 4, speed command computer 18 is of the type in which longitudinal speed is referenced to angle of attack. It includes a longitudinal speed command circuit that compares signals representing an actual angle of attack and a predetermined reference angle of attack and develops a signal that is used to command a predetermined longitudinal speed. The reference angle is varied in accordance with the extent of wing flap deployment, and for this purpose a function generator 82 develops a programmed, reference signal at output 84 as a function of the flap position information received from input means 26. At a junction 86 the reference angle signal is subtractively combined with a sensed angle of attack from input means 22 to develop an angle of attack error signal that subsequently becomes a signal representative of the difference between the actual longitudinal aircraft speed and a reference or desired speed. Before this speed error signal appears at the output of computer 18 it is filtered, varied in gain and dampened by circuitry including noise filter 90, gain stage 92, filter 94, gain stage 96, limiter 98 and signal combining junctions 100, 102 and 103. As will be recognized by those skilled in the art, the foregoing circuitry is representative of an angle of attack referenced speed command computer used in conjunction with flight director systems.

Briefly, filter 90 is a lag compensator for filtering out certain noise signals in the angle of attack error signal. The circuitry including gain stage 96, limiter 98 and junction 103 serves to dampen the error signal at junction 100 in accordance with the rate and direction of change of longitudinal acceleration and pitch attitude. Similarly, filter 94 in response to a signal representing elevator position, applies a damping factor to the angle of attack error signal at junction 102, where the transfer function of filter 94 is selected to convert the elevator position signal in to a signal that approximates the rate of change of the angle of attack. The result is a speed command signal that varies to achieve short period damping of the aircraft.

Angle of attack (input means 22) may be sensed by any of a variety of well knwon tranducers such as an airflow direction sensor of the type mounted on the fuselage, or a wing-mounted lift transducer. Longitudinal acceleration may be sensed by an accelerometer, such as a pendulum type acceleration sensor, compensated for actual pitch by means such as a vertical gyroscope.

The speed error signal developed by computer 18 is connected over a first output line 105 to the fast-slow meter movement (not shown) that positions speed command pointer 42 of indicator 16, and over a second output line 107 to the flight director computer 20. A gain stage 109, serially connected with line 107 provides suitable gain scaling for the signal fed to computer 20. As explained more fully herein, the speed error signal on line 107 is used, during the longitudinal speed command mode to control the position of the pitch command bar 40 of indicator 16, in addition to the position control of pointer 42.

For completeness, computer 20 is shown in FIG. 4 to include some circuitry that is not operative during the times of interest to the present invention (namely the post-takeoff climb interval); and is included only to give context to the modifications made for this embodiment of the invention.

Pitch attitude information from vertical gyro signal input means 30 is connected to a junction 115 at which a pitch down bias (e.g. $-2°$) is introduced when system 11 (FIG. 1) is in the guide slope (G.S.) mode and switch 117 is closed. A lag filter 119 connected between junctions 115 and 120, and a connecting line 122 to another downstream junction 124, form a washout filter circuit in which signals (representing actual pitch) are combined into the pitch command signal path with opposing polarities, to allow the pilot to smoothly control the elevators to satisfy a sudden change in aircraft pitch. Filter 119 is provided with a relatively long time constant (e.g. 15 seconds) and the lagging output signal therefrom is substractively combined with a pitch command signal at junction 120. The unfiltered attitude signal is combined downstream with opposing polarity (additively) at junction 124 to cause an immediate, corrective change in the pitch command signal (in response to a change in actual pitch), and is gradually cancelled out by the delayed signal from filter 119. A limiter 126 interposed between junctions 120 and 124 limits the angle of the pitch command.

A guide slope (G.S.) capture circuit, operative only during approach, includes a G.S. deviation circuit 128 that responds to ground originating radio navigation signals to produce a G.S. beam error signal applied at junction 120 through a switch 130. Switch 130 is open, thus disabling this circuit, at all times pertinent to the operation of the present invention. Similarly, an altitude hold error signal path including circuit 132 responsive to input means 32, a gain stage 133 and a switch 135, is disabled (by switch 135 being open) during the operation of the invention.

The remaining input signal to junction 120 is developed by a vertical speed command circuit that has been added to computer 20 to provide the desired pitch command during the thrust cutback interval. It includes a vertical speed computer 137 that receives computed air data signal information from input means 32 and produces a signal representative of vertical speed ($\dot{h}$). This signal ($\dot{h}$) is subtractively combined at junction 139 with a vertical speed bias (reference) signal ($\dot{h}_{bias}$) to develop a vertical speed error signal ($\Delta\dot{h}$). Computer 137, although here shown as a separate circuit, may be a portion of a standard air data computer, at the heart of which is an electro-mechanical altimeter that produces an electrical signal which increases and decreases with corresponding changes in altitude. To produce the vertical velocity signal ($\dot{h}$) computer 137 includes means for taking the time differential of the altimeter signal. The vertical speed bias ($\dot{h}_{bias}$) may be produced by a potentiometer 140 and has a speed selection range of 0 to 1000 feet per minute. Vertical speed error signal ($\Delta\dot{h}$) is fed through a lag filter 142 and a switch 144 to junction 120, and from there through limiter 126 to junction 124 where it is available for connection to the meter movement of the pitch command bars of indicator 16 (FIG. 1). Such connection occurs when the arm of a switch 146 closes on contact 148 and mode selection switch 150 (controlled by knob 44 on selector 15-FIG. 1) is in the SC mode. The circuitry shown here for computer 20 is also used during flight director modes other than the SC mode and thus the output of junction 124 may be connected as indicated by dotted line 162 to other mode positions of switch 150.

Computer 20 has a roll command signal path (for controlling the roll mode of command bar 40-FIG. 1) including limiter circuit 152 (to limit the angle of the commanded roll), switch 154 and a signal combining junction 156 at which desired roll commands are subtractively combined with the roll attitude sensed by the vertical gyro. Roll command input signals are developed by circuitry (not shown) responsive to a radio or pilot selected heading which is converted to an appropriate roll command for display on indicator 16. The pilot responds to the roll command and thereby steers the aircraft into the proper course or heading. The only relationship of this portion of computer 20 to the present invention is the provision of switch 154, in series with the roll command signal, which opens during the fixed vertical speed mode to command a wings level attitude. The roll command signal applied at input 158 of junction 156 drops to zero when switch 154 is opened and indicator 16 thereupon commands the pilot to steer the plane into a zero roll attitude, the execution of which nulls the signals at junction 156.

Switches 144, 146 and 154 are jointly operated by the timed control signal from clock 12 applied to computer 20 over line 56 (FIG. 1). Solid state switches, relays, or other well-known electrically controlled switching devices may be utilized for these switches. Before the thrust cutback time and after the thrust restoration time, switch 144 is open, switch 154 is closed, and switch 146 has its movable arm closed on a contact 160 from line 107 of computer 18. During the thrust cutback interval (hand 62 of clock 12 lying between pointers 64 and 66-see FIG. 2), switch 144 is closed, switch 154 is open, and the arm of switch 146 moves from contact 160 to contact 148.

OPERATION

During preflight preparation, the crew refers to appropriate flight path departure charts, tables or other reference material (prepared in advance and distributed to the crews) to find the specified thrust cutback and restoration times for the particular aircraft, airport, runway and departure flight-path in use. These times may be adjusted for such factors as gross weight, wind conditions field pressure etc. They may be arrived at mathematically (by using well known navigational analysis) or empirically (such as by timing the flight from brake release and noting the times at which the aircraft crosses the community boundaries.

The ascertained times are set on clock 12 (FIG. 2) using control knobs 68 and 70 to position adjust pointers 64 and 66. Selector 15 of system 11 (FIG. 1) is disposed in the SC mode by means of knob 44.

When start logic 52 (FIG. 1) detects the coincidence of brake release, throttle advance and on-the-ground signals from switches 50, 48 and 46, clock 12 commences timing, and concurrently the aircraft accelerates down the runway at full takeoff thrust. After rotation and lift-off, the speed command mode operates pitch command bar 40 of indicator 16 to direct the pilot into a pitch-up, steep climb (FIG. 3). During this time the aircraft has accelerated from the rotation speed ($V_R$) to a predetermined, safe climb-out speed ($V_2$ + a 10 knot safety factor in case of engine-out). The position of pointer 42 on indicator 16 (FIG. 1) displays any difference (fast or slow) between the actual longitudinal speed (sensed by the angle of attack) and the desired, climb-out speed of $V_2$ + 10 knots, determined in computer 18 by function generator 82 in response to flap deployment. If the aircraft is going too fast or too slow, speed command computer 18 applies the proper corrective signal to the pitch command bar 40 through computer 20 (FIG. 4), commanding a pitch-up to slow down and a pitch-down to speed up.

Under usual circumstances, the landing gears will have been retracted at this point, while the flaps remain at the initial take-off deployment.

Several seconds before the cutback time is reached, indicator light 72 flashes on and off, alerting the pilot to the impending pitch-down command. As hand 62 crosses pointer 64, the indicator light 72 comes on steady and the timing signal on line 56 (FIG. 1) operates switches 144, 146 and 154 (FIG. 4) in the above described manner, disposing the output of computer 20 in the fixed vertical speed mode.

Thereupon, the pitch command bar 40 of indicator 16 (FIG. 1) is controlled by the fixed vertical speed mode of computer 20. The vertical speed bias of input means 34 (set on potentiometer 40 shown in FIG. 4) is selected to command a steady, gently upwardly sloping climb during the fly-over of the community (times $t_1-t_2$ in FIG. 3). The selected fixed rate of climb is substantially less than the steep climb experienced during the initial stage of the post take-off interval (up to $t_1$ in FIG. 3). Thus the signal applied to the pitch command bars of indicator 16 at cutback time $t_1$ causes an abrupt pitch-down indication. The pilot responds to the pitch-down command by smoothly, manually operating the elevators to decrease the aircraft pitch. Concurrently or immediately thereafter, the throttle is cut back to reduce thrust. The amounts of pitch-down and thrust reduction are determined by the signal controlled displays (bar 40 and pointer 42) on indicator 16. The pitch and thrust controls are piloted in the normal manner to align symbol 38 with bar pitch command 40 and to center the speed error pointer 42. For the duration of the thrust cutback interval, these indicator commands are satisfied by small pitch and thrust adjustments performed by the pilot. This maintains the fixed vertical velocity of the aircraft, and maintains the longitudinal speed ($V_2$ + 10 knots) achieved during the initial SC mode.

Several seconds before thrust restoration time ($t_2$ in FIG. 3) indicator light 72 changes from steady illumination to a flashing condition, preparing the pilot for the upcoming mode change of the flight director. As clock hand 62 sweeps past pointer 66, computer 20 of system 11 reverts to the normal, SC mode. Since the airplane is at reduced thrust, the pitch and speed commands on indicator 16 are already satisfied, and there is no sudden shift of bar 40. The pilot may thereupon proceed to continue the climb at a steeper rate by pitching up and restoring full throttle (the usual case in order to finish the climb-out manuever), accelerate at the same climb angle, or clean-up (retract flaps) or any combination thereof as appropriate or necessary for normal flight operation.

In the foregoing manner, a surprisingly effective, yet easily implemented noise reduction system is provided. Except for clock 12, start logic 52 and certain modifications to flight director system 11, the apparatus utilizes instrumentation that is standard equipment on many aircraft. A standard flight director system, having an angle of attack referenced speed command mode can be readily modified for use in the present invention. In the disclosed embodiment, system 11 is a flight director manufactured by Collins Radio Company, Cedar Rapids, Iowa, Model FD-108 using a 329B-7C indicator, modified to include an angle of attack reference speed command computer 18 of the type manufactured by Safe Flight Instruments Corp., White Plains, N.Y.; mode change switches 144, 146 and 154, and the fixed vertical speed circuit including potentiometer 140, computer 137, junction 139 and filter 142 of computer 20. Computer 137 and the associated air data computer input means 32 may be of the type manufactured by Honeywell Inc., Hopkins, Minn. It will be appreciated however, that other flight director systems constructed and operating in accordance with the principles of the disclosed invention, can be employed.

While the invention has been disclosed herein by way of an illustrative embodiment, it will be readily apparent to persons skilled in the art that changes and modifications may be made thereto without departing from the spirit of the invention.

For example, in some cases it may be desirable to provide for automatic piloting of the aircraft during the fixed vertical speed mode, and in such case, the control signals utilized by indicator 16 (FIG. 1) may be fed (in a well-known manner) to an automatic pilot servo system controlling the aircraft airfoils, and/or controlling the thrust.

While the vertical speed bias (input means 34 in FIG. 4) is preferably set to provide positive climb bias to computer 20, it can be set to zero (constant altitude) or even modified to apply a fixed negative value to the computer for commanding a gradual descent during the thrust cutback interval.

The cutback and restoration times may be set or generated by means other than manually setting pointers on clock 12, as will be immediately recognized by those skilled in the art.

What is claimed is:

1. An apparatus for guiding a jet aircraft in a noise-abated post-takeoff climb, comprising:
a flight director having a first circuit means for producing a first electrical signal representing a difference between a sensed longitudinal air speed and a predetermined longitudinal air speed, and having a second circuit means for producing a second electrical signal representing a difference between a sensed vertical speed and a predetermined vertical speed;
signal utilization means including means for commanding a longitudinal air speed and means for commanding a pitch attitude, said means for commanding a longitudinal air speed being connected and responsive to said first electrical signal produced by said first circuit means;
switching means connected between said flight director and said utilization means and having first and second modes, said switching means connecting said means for commanding pitch attitude to receive said first electrical signal produced by said first circuit means when said switching means is in its first mode and connecting said means for commanding pitch attitude to receive said second electrical signal produced by said second circuit means when said switching means is in its second mode; and
timing control means for producing a control signal for operating said switching means at a predetermined elapsed time from the start of a takeoff run, said switching means initially assuming said first mode so that said means for commanding a pitch attitude produces a command that for a predetermined takeoff thrust level causes the aircraft to achieve and maintain said predetermined longitudinal air speed, said switching means being responsive to said control signal to assume said second mode in which said means for commanding a pitch attitude now produces a command in accordance with said predetermined vertical air speed which at said predetermined longitudinal air speed as commanded by said means for commanding a longitudinal air speed requires a reduction in thrust to a level that is substantially less than said predetermined takeoff thrust level.

2. The apparatus set forth in claim 1, wherein said utilization means includes a pitch command indicator means providing said means for commanding pitch attitude and a speed command indicator means providing said means for commanding longitudinal air speed, said pitch command indicator means indicating the amount and direction of pitch change required of the aircraft, said speed command indicator means indicating whether the aircraft is travelling faster or slower than said predetermined longitudinal air speed.

3. The apparatus set forth in claim 1, said timing control means including:
a clock driven by an electrical timer means, said clock visually displaying the elapsed time from said start and said timer means producing said control signal at said predetermined time, and a start control means for automatically starting said timer means in response to predetermined conditions indicating said start of a takeoff run.

4. The apparatus set forth in claim 3, wherein said predetermined conditions are brake release and thrust throttle advance, and said start control means includes means for starting said timer means in response to the coincidence of said predetermined conditions.

5. The apparatus set forth in claim 3, further comprising, manually settable means disposed on said clock for setting said predetermined time.

6. The apparatus set forth in claim 1, wherein said timing control means includes means for terminating said control signal at a second predetermined time from the start of a takeoff run at which said switching means reverts to said first mode.

7. The apparatus set forth in claim 6, wherein said timing means includes means for manually setting the first named predetermined time and said second predetermined time.

8. The apparatus set forth in claim 1, wherein said means for selecting said predetermined vertical speed has means defining a range of selectable speeds from 0 to 1,000 feet per minute, inclusive.

9. The apparatus set forth in claim 1, wherein said first circuit means comprises an angle of attack referenced longitudinal speed command computer.

10. A method of producing electrical control signals to be displayed by a pilot command indicator for assisting a pilot in guiding an aircraft in a post-takeoff noise abatement flight over a noise sensitive area proximate an airport, comprising:
- initially producing a first pitch attitude command signal representing a difference between a sensed longitudinal air speed and a predetermined longitudinal air speed, said first pitch attitude command signal commanding a pilot to pitch the aircraft such that when it is powered at a predetermined takeoff thrust level it will attain said predetermined longitudinal air speed;
- producing a control signal at a predetermined time from the start of a takeoff run;
- in response to said control signal producing a second pitch attitude command signal representing a difference between a sensed vertical speed and a predetermined vertical speed;
- and concurrently with said step of producing said second pitch attitude command signal, producing a longitudinal speed command signal representing said difference between said sensed longitudinal air speed and said predetermined longitudinal air speed, together said second pitch attitude command signal and said longitudinal speed command signal commanding a pilot to pitch the aircraft so that it will assume said predetermined vertical speed and to concurrently reduce thrust to a level substantially below said predetermined takeoff thrust level in order to maintain said predetermined longitudinal air speed.

11. The method set forth in claim 10, further comprising the step of terminating said control signal at a second predetermined time from said start and in response to said termination producing said first pitch attitude command signal, whereby said first named predetermined time and said second predetermined time are preselected to synchronize the timing of the production of said second pitch attitude command signal with boundaries of the noise sensitive area.

12. The method set forth in claim 10, further comprising the steps of displaying said first and second pitch attitude command signals on a flight director pitch command indicator and displaying said longitudinal speed command signal on an indicator showing whether the sensed longitudinal air speed is faster, slower or equal to the predetermined longitudinal speed.

13. The method set forth in claim 10, including the step of selecting said predetermined vertical speed to lie within and inclusive of a range of speeds from 0 to 1,000 feet per minute.

* * * * *